United States Patent [19]

Rawson

[11] 4,155,620

[45] May 22, 1979

[54] ROTATING MIRROR OPTICAL SCANNER WITH FLAT SCAN AND LINEAR SCAN RATE

[75] Inventor: Eric G. Rawson, Saratoga, Calif.

[73] Assignee: Xerox Corporation, Stamford, Conn.

[21] Appl. No.: 833,781

[22] Filed: Sep. 15, 1977

Related U.S. Application Data

[63] Continuation of Ser. No. 688,509, May 20, 1976, abandoned.

[51] Int. Cl.² .......................................... G02B 27/17
[52] U.S. Cl. ................................................... 350/6.6
[58] Field of Search ................ 350/6, 7, 6.91; 355/8, 355/66; 358/206, 208

[56] References Cited

U.S. PATENT DOCUMENTS

| | | | |
|---|---|---|---|
| 3,360,659 | 12/1967 | Young | 350/7 |
| 3,734,605 | 5/1973 | Yevick | 350/6 |
| 3,764,192 | 10/1973 | Wheeler | 350/7 |
| 3,973,825 | 8/1976 | Starkweather | 350/6 |
| 4,025,154 | 5/1977 | Yuta | 350/6.91 |

Primary Examiner—Jon W. Henry

[57] ABSTRACT

An optical scanning system in which a focused light beam is scanned across an image plane by a rotating or reciprocating scan mirror and wherein the field curvature of the focused light beam is substantially reduced by moving the point of intersection between the optic axis of the scanning light beam and the scan mirror as a function of the rotation or reciprocation of the scan mirror and wherein movement of that point of intersection is controlled by having the distance R between the mirror and its point of rotation or reciprocation and the distance h between the image plane and the point of intersection of the optic axis of the scanning beam and the scan mirror approximate the relationship $R = 2\sqrt{2h}$. In the case of the scan mirror having a reciprocating movement, the optical scanning system compensates for non-linearity in the sweep of the scanning light beam across the image plane by utilizing a non-linear lever system to reciprocate the scan mirror.

8 Claims, 7 Drawing Figures

ROTATING MIRROR OPTICAL SCANNER WITH FLAT SCAN AND LINEAR SCAN RATE

This is a continuation of application Ser. No. 688,509 filed May 20, 1976, now abandoned.

BACKGROUND OF THE INVENTION

In many optical scanning systems a final moving mirror is used between the final converging lens and the image plane. Such a moving mirror could be used for the relatively slow y-scan after a rotating prism and other optics have generated a relatively fast x-scan. A major problem associated with such scanning systems is that, in general, as the final mirror rotates, the point of focus of the scanning light beam will follow a curve which does not lie in the image plane. For example, if the mirror pivots or rotates about a fixed axis lying in the plane of the mirror, the point of focus will follow a circular path of fixed scan radius with the result that the beam will be substantially out of focus at the two ends of the scan if it is in focus at the center of the scan.

A common solution to the aforedescribed "field curvature" problem is to make the scan radius very large, thereby reducing the necessary scan angle and the deviation from flatness of the focus path. For a given image resolution, this solution requires large, slow and often expensive optical components. Another solution to the "field curvature" problem is to shift the scan mirror during its pivotal movement in a direction transverse to the axis of its pivotal movement. This shifting movement of the mirror is so controlled and predetermined, for example, by a cam surface, that for each angular setting of the mirror the total length of the light path to the image plane is the same for all angular settings or positions of the mirror. For accurate mirror movement in a direction substantially transverse to the axis of the pivotal movement of the mirror, the latter solution requires that the cam have a precision ground non-linear surface which is often expensive and difficult to produce.

OBJECTS OF THE INVENTION

It is an object of the present invention to provide an improved optical scanning system.

It is a further object of the present invention to provide an optical scanning system which minimizes "field curvature".

It is a still further object of the present invention to provide a reciprocating scanner system having non-linear sweep correction.

SUMMARY OF THE INVENTION

In accordance with the invention, an optical scanning system is provided wherein the final scan mirror pivots about a point displaced from the scan mirror by a distance R which is related to the displacement h between the image plane and the point of intersection of the optic axis of the scanning beam and the scan mirror. When the scanning beam undergoes a 90° deflection by the scan mirror at the center of the scan line, the ratio R/h is equal to $2\sqrt{2}$. With the stated relationship between R and h, the scanning light beam moves as a function of the scan mirror deflection angle in such a manner that "field curvature" at the scanned image plane is substantially reduced. The scan mirror can have either a reciprocating movement provided by a support arm reciprocating about the pivot point or a rotational movement provided by rotation of a scannning polygon about the pivot point. In the case of reciprocating movement of the scan mirror, a non-linear lever arrangement is provided in accordance with the invention to increment the movement of the scan mirror support arm in a non-linear fashion to thereby compensate for non-linearities in the sweep of the scanning light beam across the image plane which would be present if such a non-linear lever system were not utilized to move the scan mirror support arm.

DETAILED DESCRIPTION OF THE INVENTION

As noted, a major problem associated with optical scanners utilizing a mirror to sweep a converging light beam across an image plane is that the path of focus of the converging light beam will follow a curved path which does not lie in the image plane. For example, relating to FIG. 1, if the mirror 2 rotates about fixed axis 0, as shown, the point of focus of the light beam 4 will follow a circular path 6 of fixed scan radius with the result that the converging light beam 4 will be substantially out of focus at the two ends B and C of the scan line if it is in focus at the center A of the scan line.

Figure 1:
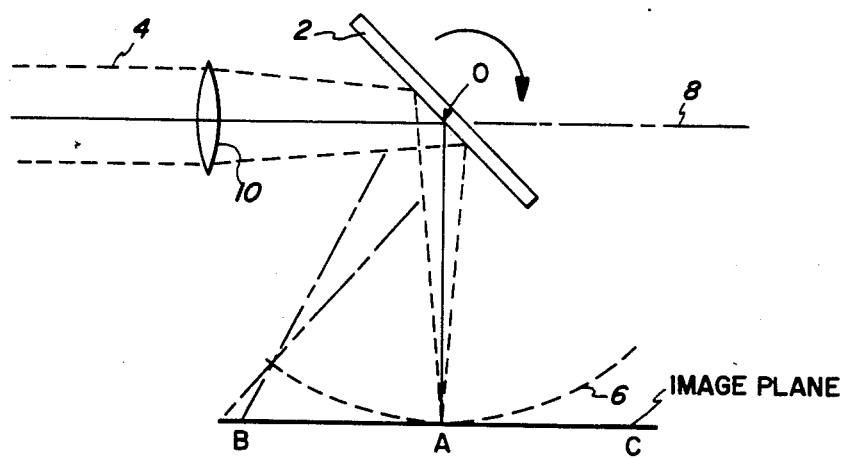
FIG. 1 shows the "field curvature" produced by mirror rotation in prior art scanners.
Figure 2A:
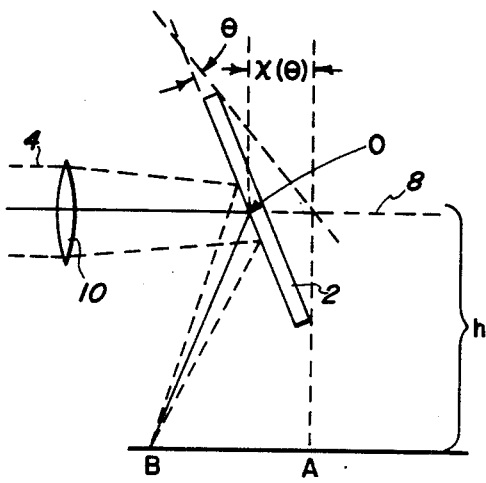
FIGS. 2A and 2B depict movement of the mirror toward the final system lens with mirror rotation.
Figure 2B:
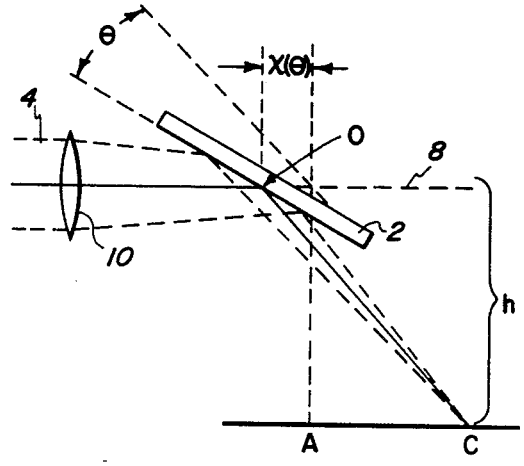

FIGS. 2A and 2B show the principle by which the present invention corrects the "field curvature" problem depicted in FIG. 1 by moving the mirror 2 along the optic axis 9 of the scanning light beam 4 as the mirror 2 rotates about axis 0. As the mirror rotates in either a clockwise direction (FIG. 2A) or a counterclockwise direction (FIG. 2B) from its central position which directs the scanning beam at the center of the scan line, the point where the mirror 2 intercepts the optic axis 8 of the light beam 4 shifts or moves toward the final converging lens 10 by a distance x ($\theta$) which is a function of the mirror rotation angle $\theta$ such that the optical path length from the final converging lens 10 to the image plane is always substantially constant. Analysis shows that this shift should be $$x(\theta) = h(\frac{1}{\cos 2\theta} - 1) = \frac{2h \sin^2\theta}{\cos 2\theta} \quad (1)$$

for perfect field flatness where h is as shown. Where $\theta$ is small, i.e., where $\theta$ has an absolute value of no more than approximately 10°, equation (1) can be approximated by $$x(\theta) = 2h\, \theta^2. \quad (2)$$

Figure 3:
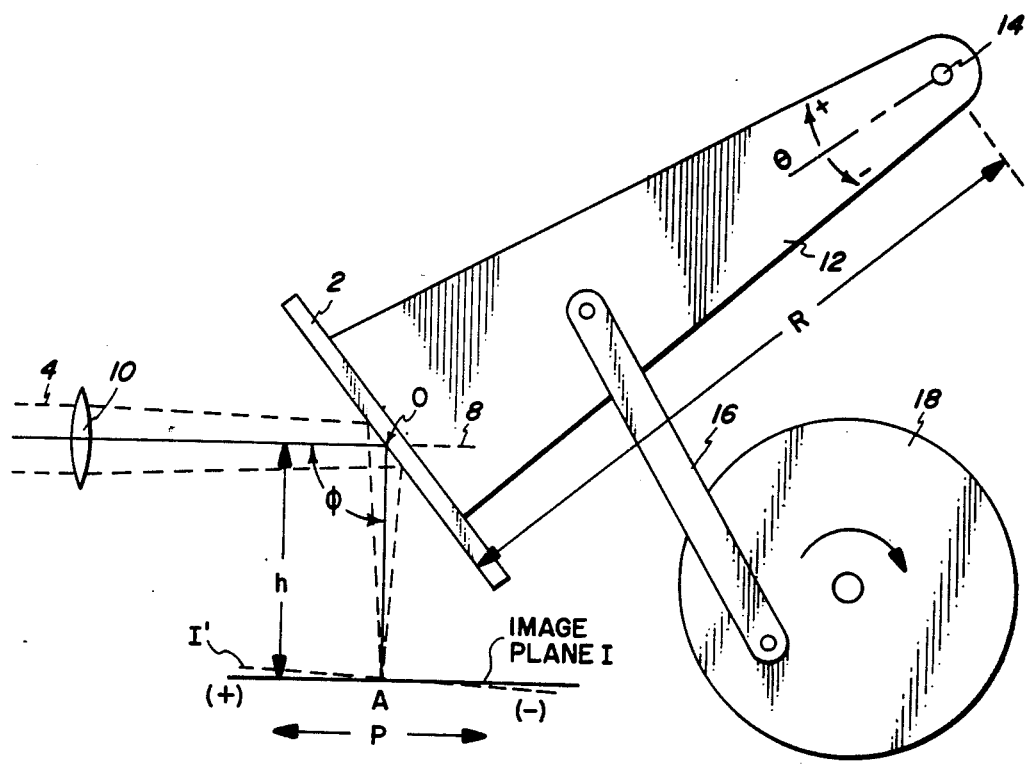
FIG. 3 is a plan view of an apparatus in accordance with the present invention for reducing substantially "field curvature".

Referring now to FIG. 3, there is shown apparatus in accordance with the present invention for providing movement of the mirror 2 along the optic axis 8 approximately in accordance with the rotation relationship of equation (2). As shown, the mirror 2 is mounted at one end of a support arm 12 which is pivoted about a fixed shaft 14. Movement of arm 12 about the shaft 14 can be achieved by a variety of well-known means such as, for example, as shown, a stiff rod 16 coupled to the arm 12 and to a rotating wheel 18. Movement of the arm 12 can also be achieved by a stepper motor which would move the arm 12 in angular steps of equal size.

By considering the position where mirror 2 intercepts the optic axis 8 of the light beam 4 as the mirror 2 rotates about its central position which directs the beam 4 to the center A of the scan line, it is seen that for either positive or negative values of the angle of rotation $\theta$ the intercept point will move toward lens 10 a distance defined as $x'(\theta)$. Analysis shows that when $\phi$ equals 90°

$$x'(\theta) = \frac{2 R \sin^2\left(\frac{\theta}{2}\right)}{\sin(\pi/4 + \theta)}. \tag{3}$$

When $\theta$ is small, equation (3) can be approximated by $$x'(\theta) \simeq \frac{R \theta^2}{\sqrt{2}} \tag{4}$$

where R is the distance from the shaft 14 to the mirror 2 as shown in FIG. 3. For best field flatness it is desirable that $x'(\theta) = x(\theta)$, and using equations (2) and (4) it becomes clear that $x'(\theta) \simeq x(\theta)$ when $$R = 2\sqrt{2}\, h \tag{5}$$

That is, equation (5) is the relationship between R and h for achieving maximized field flatness when $\phi$ equals 90°. When the value of R is in accordance with equation (5) the residual field curvature is very small and is given by $$\Delta_{fc} = x(\theta) - x'(\theta) = \frac{2 h \sin^2 \theta}{\cos 2\theta} - \frac{4\sqrt{2}\, h \sin^2(\theta/2)}{\sin(\pi/4 + \theta)} \tag{6}$$

where use has been made of equations (1), (3) and (5). Equation (6) reduces to $$\Delta_{fc} = 2h\theta^3[1 - \theta + \text{(terms of higher order of } \theta)] \tag{7}$$

which shows that the remaining field curvature is very small when using the apparatus of FIG. 3 with $R = 2\sqrt{2}h$. For example, for $h = 10$ centimeters and $\theta = 5°$, the uncorrected apparatus shown in FIG. 1 yields a maximum field curvature error of $\Delta_{fc} = 1.54$ mm. The apparatus of FIG. 3 with $R = 2\sqrt{2}h$ yields, at worst, $\Delta_{fc} = 0.145$ mm, more than a ten-fold reduction for this particular case.

Table I also illustrates the effectiveness of the apparatus of FIG. 3. Table I shows that if $\theta$ ranges over $\pm 2°$ the apparatus of FIG. 3 reduces the field curvature described in relation to FIG. 1 by a factor of at least 30. If $\theta$ ranges from $-5°$ to $+5°$, the apparatus of FIG. 3 reduces the field curvature described in relation to FIG. 1 by a factor of at least 10. If $\theta$ ranges between $-10°$ and $+10°$ the advantage of the apparatus of FIG. 3 is somewhat reduced but a correction factor of at least 5 is still achieved. When $\theta$ is not equal to 90°, the ratio of R to h which minimizes field curvature will vary slightly from the $2\sqrt{2}$ value.

Since $\Delta_{fc}$ is an odd function of $\theta$, the maximum error can be further reduced by about a factor of 2 by rotating the Image Plane I in FIG. 3 clockwise about the central imaging point A by a small angle such that the average $\Delta_{fc}$ error is minimized. For example, in FIG. 3, the Image Plane I could be rotated about 0.2° to the position I' to minimize the average $\Delta_{fc}$ error.

Figure 4:
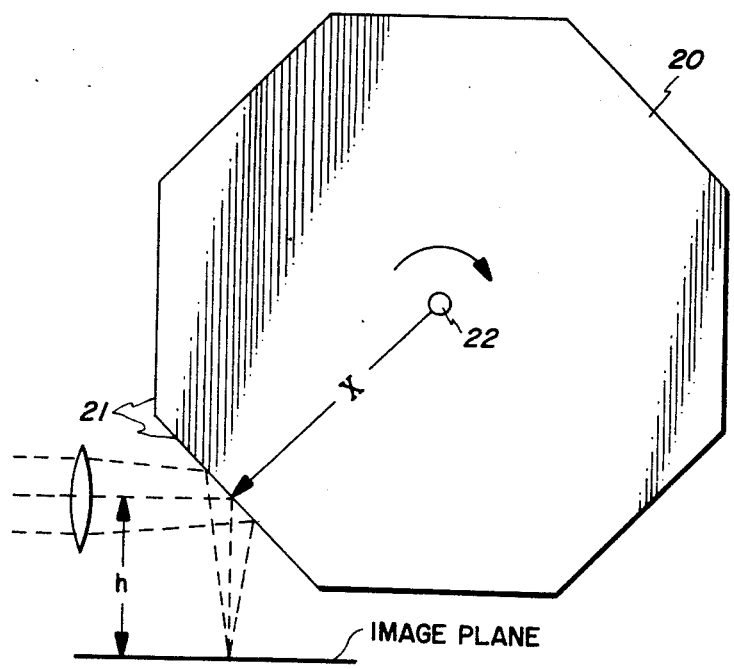
FIG. 4 shows use of a polygon scanner to reduce substantially "field curvature".

FIG. 4 shows a variation of the apparatus of FIG. 3 in which the reciprocating mirror 2 is replaced by a rotating polygon mirror, represented in FIG. 4 by an octagonal mirror 20 having mirrored faces 21 and rotating about its center on shaft 22. To reduce field curvature the center-to-face distance x of the rotating polygon should be $2\sqrt{2}$ times larger than h, as discussed in relation to FIG. 3.

Figure 5:
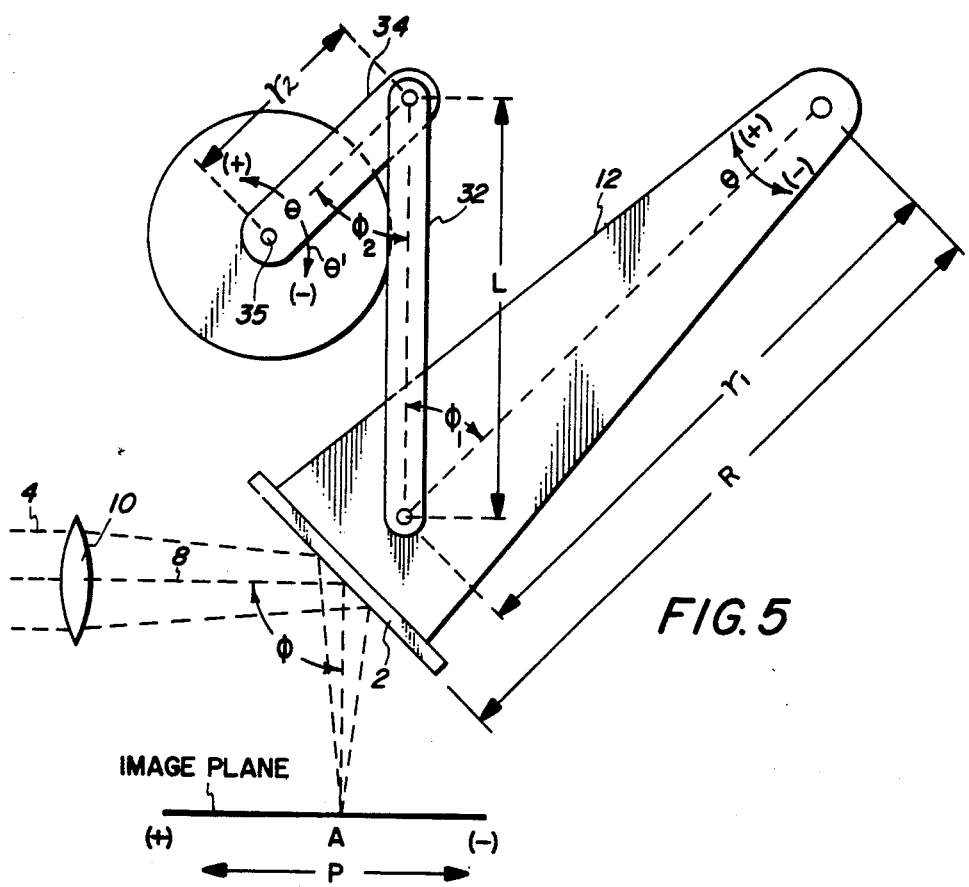
FIG. 5 shows an optical scanner having correction for "field curvature" and non-linear sweep.

The scanners shown in FIGS. 3 and 4 do not produce a linear sweep of the focused light beam across the Image Plane I. Correction of this non-linear sweep problem is substantially reduced by the apparatus of FIG. 5. First, as shown in FIGS. 3 and 5, p is defined as the position of the focused light beam 4 in the image plane relative to its central position A (its position when $\theta = 0$). The problem is that p does not vary linearly with $\theta$. This "distortion" is also present (but to a lesser degree) in the prior art scanner shown in FIG. 1, for which $p(\theta) = 2h \tan(2\theta)$. However, for the scanner shown in FIGS. 3 and 4, the distortion is further aggravated by the lateral shift $x(\theta)$ of the point where the mirror and the principle ray of beam 4 intercept. As a result, the scanner shown in FIGS. 3 and 4 have $$\frac{p(\theta)}{2h} = \theta + \theta^2 + \frac{4}{3}\theta^3 + \text{[terms of higher order of } \theta\text{]}. \tag{8}$$

Figure 6:
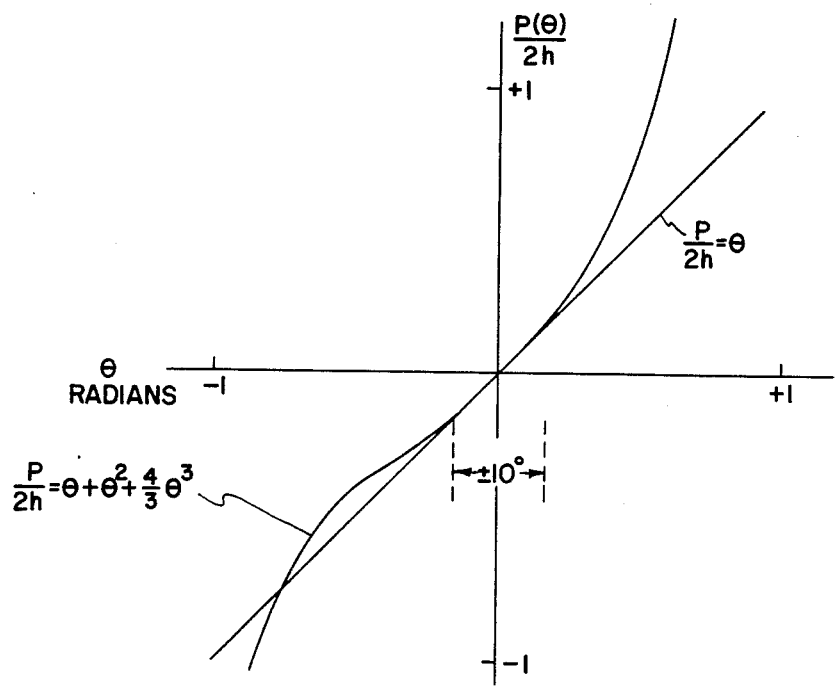
FIG. 6 is a plot of light beam position relative to mirror rotation.

The first term on the right is the desired linear term; the other terms $$(\theta^2, \frac{4}{3}\theta^3, \text{etc.})$$

are the non-linear distortion terms. In all cases of interest, the most serious is the $\theta^2$ term which is due to the mirror shift $x(\theta)$; the lesser serious $4/3\theta^3$ term is due to the tangent $(2\theta)$ dependence of p. FIG. 6 plots $p(\theta)/2h$ against $\theta$ in radians. The upper curve in the first quadrant is the third order approximation of $p(\theta)/2h$ (equation 8) that the scanners of FIGS. 3 and 4 actually give and the straight line at 45° is the ideal scan which one would like to have for distortion-free scanning. It can be seen that the error is small for very small angles of $\theta$, and for $\theta$ up to plus or minus 10° (which would include most cases of interest) the error is due primarily to $\theta^2$ and is always towards more positive values of p. Referring again to FIG. 3, the points on the image plane I corresponding to equally incremented steps in the mirror angle $\theta$ will be crowded together more and more as p goes negative, and will be spread apart more and more as p goes positive. Also, if the scanning polygon of FIG. 4 rotates at a constant angular velocity, the sweep velocity in the image plane, dp/dt, will be slow when p is negative and will become faster and faster as p goes to zero and then goes positive.

This distortion produced by non-linear sweep of the focused light beam across the image plane may be of no consequence if it can be compensated by varying the data rate to the system to the input side of the final lens.

More commonly, however, that data rate cannot be conveniently varied. Another situation where the non-linear sweep distortion is a problem is where the scan positions p are to be incremented in a step-wise fashion by a device such as a stepping motor attached, for example, to the shaft 14 of the apparatus of FIG. 3. The angular steps of a stepping motor are all of equal size, and so the corresponding p locations would be distorted as above.

The non-linear sweep distortion is substantially eliminated by the reciprocating scanner apparatus of FIG. 5 which provides a high degree of linearity of the position p with respect to the drive angle of the stepping motor or similar angular driving mechanism for moving the arm 12. Arms 12, 32 and 34 comprise a non-linear lever system whose non-linearity can be tailored, by proper choice of the parameters $r_1$, L, $r_2$, $\phi_1$, and $\phi_2$, as shown in FIG. 5, to nearly cancel out the other system non-linearity (that between $\theta$ and p as discussed earlier). The angle $\phi_1$ (between arms 12 and 32) and the angle $\phi_2$ (between arms 34 and 32) are defined when $\theta=0$. In general, $\phi_1$ need not equal $\phi_2$ but such an assumption simplifies the analysis without significant loss in generality so it is assumed $\phi_1$ equal $\phi_2$. Similarly, $r_1$ need not equal $r_2$, but we assume them to be equal to simplify the analysis. It has been found that when the arms 12, 32 and 34 have the relationship $r_1/L = r_2/L = 0.1$ that good correction of the non-linear sweep distortion is achieved when $\phi_1 = \phi_2 = 48°$. Referring to Table II, in which column 1 is the angle of rotation $\theta'$ of shaft 35, in degrees, column 2 is the corresponding $\theta$ in degrees, and column 3 is $p(\theta')/2h$, then column 4 is a measure of the deviation from the linear sweep which is given by $$\frac{\Delta p(\theta')}{2h} = \frac{p(\theta')}{2h} - \frac{p(\text{linear})}{2h} \qquad (9)$$

where p (linear)/2h is an ideal linear scan fitted to $p(\theta)/2h$ at $\theta'=0°$ and $2°$. It can be seen that the non-linearity (column 4) is less than 1° of the deflection (column 3), except near $\theta'$ equals $+10°$ where the non-linearity rises to about 1.25% of the deflection. This amount of distortion is usually considered small. Distortion could be made smaller still if the required range of $\theta'$ were further limited by increasing h. The stated relationships between R/h, $r_1/L$ and $r_2/L$ are applicable when the angle $\phi$ equals 90° since that value of $\phi$ simplifies the mathematical analysis. Deviation of the angle $\phi$ from 90° will cause the stated relationships to vary slightly and such varied relationships are within the scope of the field curvature correction aspect and the non-linear sweep aspect of the invention.

TABLE I

| $\theta$ | Approximately Corrected (FIG. 3) $\frac{f_c}{2h}$ | Uncorrected (Fig. 1) | Field Curvature Improvement Ratio |
|---|---|---|---|
| $-10°$ | $-.00439$ | $+.03209$ | 7.3 |
| $-5°$ | $-.00060$ | $+.00771$ | 12.8 |
| $-2°$ | $-.00004$ | $+.00122$ | 30.5 |
| $0°$ | 0 | 0 | — |
| $+2°$ | $+.00004$ | $+.00122$ | 30.5 |
| $+5°$ | $+.00072$ | $+.00771$ | 10.7 |
| $+10°$ | $+.00625$ | $+.03209$ | 5.1 |

TABLE II

Calculation of correction of distortion in apparatus of Fig. 5, when $r_1/L = r_2/L = 0.1$ and $\phi_1 = \phi_2 = 48°$

| $\theta'$ (deg) | $\theta$ (deg) | $\frac{p}{2h}$ | $\frac{\Delta p}{2h}$ |
|---|---|---|---|
| $-10$ | $-11.92$ | $-.1768$ | $-.001466$ |
| $-8$ | $-9.17$ | $-.1399$ | .000351 |
| $-6$ | $-6.63$ | $-.1044$ | .000800 |
| $-4$ | $-4.27$ | $-.0695$ | .000614 |
| $-2$ | $-2.07$ | $-.0348$ | .000253 |
| 0 | 0.0 | .0 | .0 |
| 2 | 1.94 | .0350 | $\sim .0$ |
| 4 | 3.76 | .0704 | .000236 |
| 6 | 5.48 | .1060 | .000760 |
| 8 | 7.10 | .1417 | .001479 |
| 10 | 8.62 | .1776 | .002295 |

What I claim is:

1. An optical system for scanning a substantially focused light beam across an image plane to provide a scanning spot, said system comprising the combination of
   lens means for projecting said light beam,
   scan means interposed between said lens means and said image plane for deflecting said light beam toward said image plane, and
   means for rotating and translating said scan means relative to said lens means at rates selected to maintain a substantially constant optical distance between said image plane and said lens means while said scan means sweeps said light beam across said image plane, said means for rotating and translating said scan means comprising a support arm having one end secured to said scan means, said support arm being mounted for rotational movement about a pivot point offset from an optical axis intercepting said lens means and said scan means.

2. The optical system of claim 1 wherein at least one of said rates of rotation and translation of said scan means is non-linearly varied as said scan means sweeps said light beam across said image plane to maintain a substantially constant scan rate for said scanning spot.

3. The optical system of claim 1 wherein
   said scan means is a mirror for reflecting said light beam toward said image plane.

4. The optical system of claim 3 wherein said means for rotating and translating said scan means relative to said lens further includes
   a drive means for rotating said support arm back and forth through a predetermined angle about said pivot point.

5. The optical system of claim 4 wherein said drive means comprises
   a rotary member having a predetermined axis of rotation, and
   linkage means having one end pivotally connected to said rotary member at a point offset from said axis of rotation and an opposite end pivotally connected to said support arm at a point offset from said pivot point.

6. The optical system of claim 5 wherein said linkage means comprises at least two pivotally connected levers for non-linearly varying the rate of rotation of said support arm through said predetermined angle to maintain a substantially constant scan rate as said light beam sweeps across said image plane.

7. The optical system of claim 6 wherein
   said optical axis is offset from said image plane by a predetermined perpendicular distance h, and
   said pivot point is displaced from said mirror by another predetermined perpendicular distance R, where $R = 2h\sqrt{2}$.

8. The optical system of claim 3 where
   said optical axis is offset from said image plane by a predetermined perpendicular distance h, and
   said pivot point is displaced from said mirror by another predetermined perpendicular distance R, where $R = 2h\sqrt{2}$.

* * * * *